US007052786B2

(12) United States Patent
Gillis et al.

(10) Patent No.: US 7,052,786 B2
(45) Date of Patent: May 30, 2006

(54) ENGINEERED INTERFACE FOR LOW FLY HEIGHT

(75) Inventors: Donald Ray Gillis, San Jose, CA (US); Remmelt Pit, Cupertino, CA (US); Vedantham Raman, Morgan Hill, CA (US); Reinhard F. Wolter, Saratoga, CA (US)

(73) Assignee: Hitachi Global StorageTechnologies Netherlands B.V., Amsterdam (NL)

( * ) Notice: Subject to any disclaimer, the term of this patent is extended or adjusted under 35 U.S.C. 154(b) by 36 days.

(21) Appl. No.: 10/757,802

(22) Filed: Jan. 14, 2004

(65) Prior Publication Data

US 2005/0153104 A1 Jul. 14, 2005

(51) Int. Cl.
*G11B 5/706* (2006.01)

(52) U.S. Cl. .................................................. 428/848.3

(58) Field of Classification Search ............... 428/65.3, 428/848.3, 141, 694 SG; 360/235.4, 246.2, 360/135

See application file for complete search history.

(56) References Cited

U.S. PATENT DOCUMENTS 6,159,076 A * 12/2000 Sun et al. ..................... 451/36
6,274,063 B1 8/2001 Li et al. .................... 252/79.1
6,426,155 B1 7/2002 Tada et al. .................. 428/652
6,454,820 B1 * 9/2002 Hagihara et al. ............. 51/308
6,468,598 B1 10/2002 Hatakeyama et al. ....... 427/552
6,537,648 B1 3/2003 Takahashi et al. .......... 428/141
6,790,509 B1 * 9/2004 Yokoyama et al. ......... 428/141
6,818,031 B1 * 11/2004 Oshima ....................... 51/308
6,852,010 B1 * 2/2005 Takahashi et al. ............ 451/36
2002/0164505 A1 11/2002 Yokoyama et al. ......... 428/694
2003/0104253 A1 6/2003 Osawa et al. ............... 428/694

OTHER PUBLICATIONS

Hara, Seiichiro, et al. "Influence of Disk Macro-Waveiness Component on Amplitude Modulation of Head Readout Signal", Journal of the Japan Society of Precision Engineers, vol. 67, Issue No. 6, Jun. 2001.

Zhang, B., et al. "Possibility of Surface Force Effect in Slider Air Bearings of 100 Gbit/in$^2$ Hard Disks", Tribology International, vol. 36, 2003.

Frost, D. "Circumferential Polishing", Datatech, vol. 1, Sep. 1998.

Marchon, B., "Glide Avalanche Prediction From Surface Topography", Transactions of the ASME, vol. 118, Jul. 1996.

* cited by examiner

*Primary Examiner*—Stevan A. Resan
(74) *Attorney, Agent, or Firm*—Zilka-Kotab, PC

(57) ABSTRACT

A magnetic disk having a low surface microwaviness at a scale of about 200 microns and higher, and a high surface roughness at a scale of less than about a length of a pad of a slider for writing to the disk.

13 Claims, 3 Drawing Sheets

ENGINEERED INTERFACE FOR LOW FLY HEIGHT

FIELD OF THE INVENTION

The present invention relates to manufacture of disk drive systems, and more particularly, this invention relates to new disk surface properties providing enhanced performance at low fly heights.

BACKGROUND OF THE INVENTION

A magnetic disk drive storage device typically comprises one or more thin film magnetic disks, each having at least one data recording surface including a plurality of concentric tracks of magnetically stored data, a spindle motor and spindle motor controller for supporting and rotating the disk(s) at a selected RPM, at least one read/write transducer or "head" per recording surface formed on a slider for reading information from and writing information to the recording surface, a data channel for processing the data read/written, a positionable actuator assembly for supporting the transducer in close proximity to a desired data track, and a servo system for controlling movement of the actuator assembly to position the transducer(s) over the desired track(s).

Each slider is attached on one surface to an actuator arm via a flexible suspension and includes on an opposite side an air bearing surface (ABS) of a desired configuration to provide favorable fly height characteristics. As the disk rotates, an air flow enters the slider's leading edge and flows in the direction of its trailing edge. The air flow generates a positive pressure on the ABS, lifting the slider above the recording surface. The slider is maintained at a nominal fly height over the recording surface by a cushion of air.

As recording density and data transfer rate have increased over the past a few years, critical dimensions in the recording device such as track width read and write gap and coil size have decreased accordingly. Also, the fly height between the air bearing surface (ABS) and the media has become smaller and smaller. For reference, recording heads with 40 $gb/in^2$ products typically have fly heights of about 12 nanometers. Modern heads have even lower fly heights, and fly heights are expected to continue to decrease. This reduction in head critical dimensions and fly height, while beneficial to magnetic performance, also comes with cost on thermal and mechanic reliability. Particularly, with lower fly heights between the head and the magnetic disk during operation of the disk drive, there is an increasing rate of intermittent contacts between the head and the disk resulting in damage to the disk surface and wear on the head elements.

To help avoid the problems caused by intermittent head-disk contact, disks are lubricated during drive build. Although the disk is coated with lubricant during manufacture to protect it from such intermittent contact, during operation of the drive, the lubricant is eventually depleted from the surface of the disk. Because of the problems associated with lubricant spin-off from the disk, a vapor phase lubricant reservoir system has been disclosed as a means for continuously maintaining a uniform lubricant film on the disk. However, as fly heights are reduced, the slider will tend to contact the disk surface and, consequently, the lubricant. It has been observed that interaction between the slider trailing edge and the free lubricant can lead to severe instabilities, causing the slider to oscillate at its second pitch natural frequency (around 300 kHz for currently tested sliders) with an amplitude of more then 5 nm. This is a serious problem for reliability purposes. Thus it would be desirable to reduce lubricant induced slider oscillation by improving and stabilizing the clearance between the slider and the disk surface to reduce significant lubricant transfer between the disk and the slider.

Disk roughness also becomes more of a problem at lower slider flying heights.

With maximum peaks more likely to protrude into a normal range of slider operation, the probability of unintended and damaging slider/disk contact increases. The risk of damage from these discontinuities is greater at lower slider flying heights. Because of this, disks are being manufactured to have very smooth surfaces. Modern disks have a surface roughness (standard deviation Rq) of about 2–4 Å as measured in the 10–100 μm range along the disk surface, and typically have a microwaviness (standard deviation Wq) of 5 Å or more in the 100–1000 μm range.

The inventors have found that such smooth surfaces create another problem, that of stiction of the slider on the disk surface. Stiction is the tendency of smooth surfaces to stick together. As the disk rotates, stiction effects during slider-disk contact causes the slider to bounce, resulting in read and write instability. The inventors have found that stiction problems are more prevalent when using disks with low Rq and low Wq.

What is therefore needed is a way to enable reduced fly height while avoiding the hereinabove mentioned problems.

SUMMARY OF THE INVENTION

The present invention overcomes the drawbacks and limitations described above by providing a magnetic disk having a low surface microwaviness (Wq) at a scale of about 200 microns and higher, and a high surface roughness (Rq) at a scale of less than about a length of a pad of a slider carrying a head for writing to the disk.

In one embodiment, the disk has a high surface roughness at a scale of less than about 200 microns. In another embodiment, the disk has a high surface roughness at a scale of less than about 100 microns.

In yet another embodiment, the disk has a low surface microwaviness at a scale of between about 500 and 1000 microns.

In a further embodiment, the disk has a low surface roughness at a scale of about 5 microns or less.

Preferably, the low surface microwaviness is defined by an average standard deviation of about 3 angstroms or less of topographical features of the disk surface at the prescribed scale. Also preferably, the high surface roughness is defined by an average standard deviation of about 4.5 angstroms or more of topographical features of the disk surface at the prescribed scale.

The unique design of the disk surface is very advantageous for use with sliders flying at a fly height of about 5 nanometers or less from the disk surface.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 1:
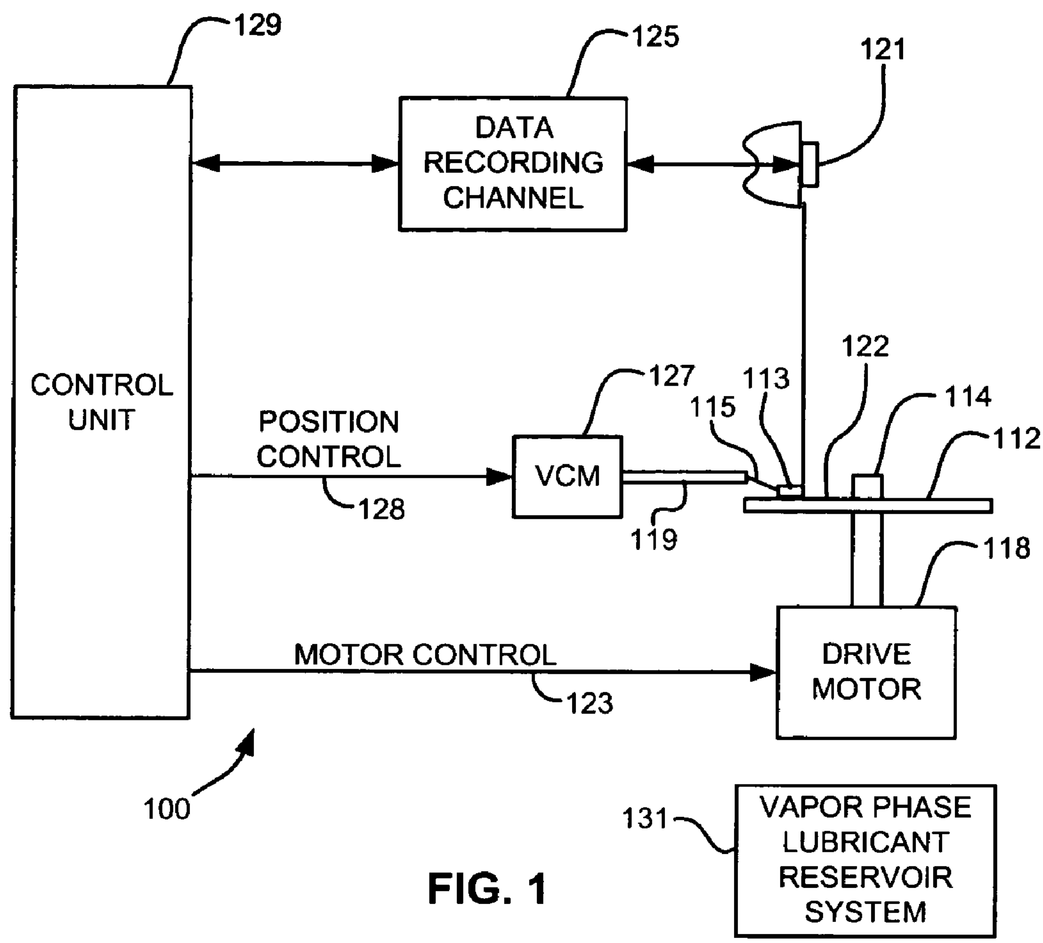
FIG. 1 is a simplified drawing of a magnetic recording disk drive system.

Referring now to FIG. 1, there is shown a disk drive 100 embodying the present invention. As shown in FIG. 1, at least one rotatable magnetic disk 112 is supported on a spindle 114 and rotated by a disk drive motor 118. The magnetic recording on each disk is in the form of an annular pattern of concentric data tracks (not shown) on the disk 112.

At least one slider 113 is positioned near the disk 112, each slider 113 supporting one or more magnetic read/write heads 121. As the disks rotate, slider 113 is moved radially in and out over disk surface 122 so that heads 121 may access different tracks of the disk where desired data are recorded. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

Figure 2:
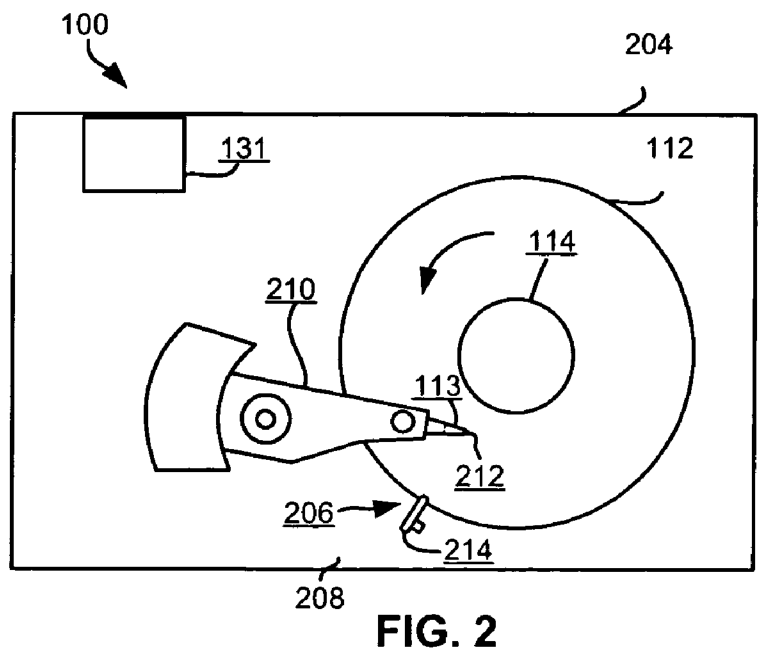
FIG. 2 is a partial top view of the disk drive system of FIG. 1 according to one embodiment of the present invention.

Referring to FIG. 2, there is shown a top view of the disk drive 100 of FIG. 1. The disk drive 100 has a disk pack comprising a plurality of stacked thin film magnetic recording disks 112 attached to the spindle 114 enclosed in housing 204. Load/unload structure 206 is fixedly secured to the base plate 508 of the housing 204 of the disk drive at the outer perimeter of disk pack. A rotary actuator assembly comprises a plurality of actuator arms 210 each supporting a slider 113 adjacent to a disk 112. Each actuator arm 210 suitably has a protrusion or tab 212 at its distal end for engaging a ramp 214 of the load/unload structure 206 during load/unload operations. The vapor phase lubricant reservoir system 131 is positioned in the housing 204. A vapor phase lubricant reservoir system 131 such as the systems described in U.S. Pat. No. 4,789,913 and/or U.S. Pat. No. 6,580,585 can be implemented. These patents are incorporated herein by reference.

Figure 3:
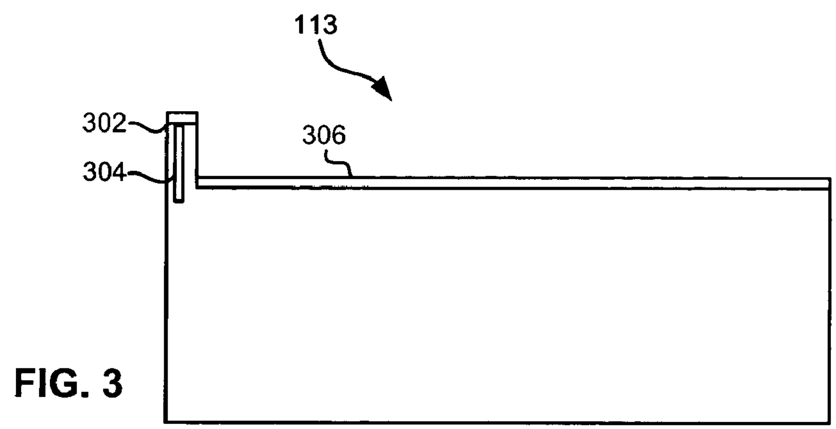
FIG. 3 is a simplified side view of a slider, not to scale, according to one embodiment.

FIG. 3 illustrates a slider 113 according to one embodiment. As shown, a protruding pad 302 is positioned above the read/write elements 304. An overcoat 306 of carbon, $SiN_x$, etc. is formed over the entire structure.

The above description of a typical magnetic disk storage system, and the accompanying illustration of FIGS. 1–3 are for representation purposes only. It should be apparent that disk storage systems may contain a large number of disks and actuators, and each actuator may support a number of sliders.

The inventors have characterized several magnetic recording disk surfaces designed for low flying heights, and have found that that a "hybrid" characteristic—higher roughness at the lower wavelength and lower microwaviness provides the best performance. In contrast, and counterintuitively, disks that have lower roughness at the lower wavelength and lower microwaviness (i.e., smoother disk surfaces) provide the worst performance.

Figure 4:
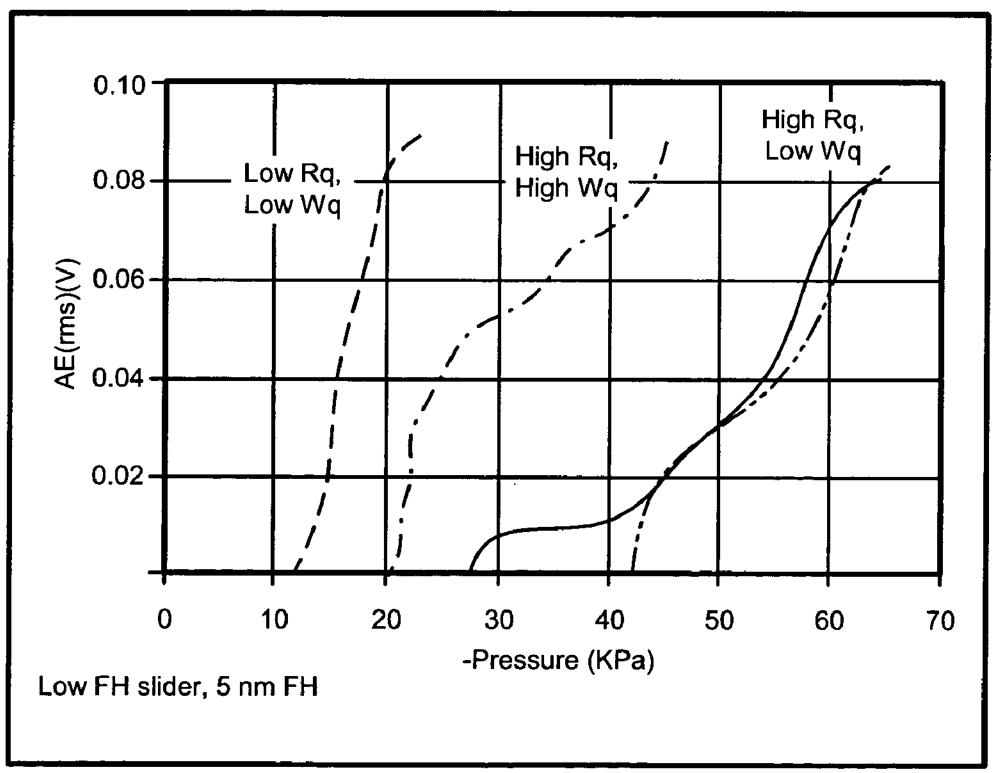
FIG. 4 is a chart illustrating test results of a takeoff pressure test that measures the occurrence of head-disk interactions.

FIG. 4 illustrates results of a takeoff pressure test that measures the occurrence of head-disk interaction and, consequently, the likelihood that such interaction will lead to issues relating to servo problems, repeatable run out (RRO) issues, etc. In FIG. 4, all measurements were taken with same slider flying at about 5 nm, but on four disks having different surface properties: 1) high Rq, low Wq; 2) high Rq, low Wq; 3) high Rq, high Wq; 4) low Rq, low Wq. Rq is measured at a scale of less than about 200 microns, which is about the size of the pad on the slider used. Wq is measured at a scale of about 200–1000 microns. Lower Rq and Wq values correspond to smoother surface properties.

With continued reference to FIG. 4, as ambient pressure in the drive is reduced (X axis), the slider flies at lower and lower fly heights. Accoustic emissions (AE) are used to measure the slider-disk contact, in this case by an AE measuring device placed on or near the slider. A desirable AE count is less than about 0.02 to avoid stability issues. For instance, if too much slider-disk contact occurs, the slider tends to bounce, which leads to instability.

Intuitively, smoother disk surfaces should allow the slider to fly closer to the disk surface without interference. However, what has been found is that once a certain smoothness has been reached, the attractive forces between the disk and slider come into play to cause stiction problems. As shown, at lower surface roughness and microwaviness, the slider contacts the disk surface rather quickly upon a drop in ambient pressure. The inventors have found that the figure of merit attribute for low flying disk surfaces is (a) higher roughness and (b) lower microwaviness in the realm of low flying heights, typically less than about 5 nm of mechanical spacing.

Modern disks have an Rq of about 2–4 Å, and a Wq of 5 Å or more. The inventors have found that the most desirable disk surface properties are an Rq of 4.5 Å and higher, and the Wq reduced to about 3 Å or less for sliders of about 500 μm in length, the sliders having pad lengths of about 200 μm. These values generally apply to all disk substrates, e.g., glass, Al—Mg, polymer, etc. Also note that pad sizes are also being reduced to assist in reducing contact area of the slider with the disk. Accordingly, the desired disk surface properties may scale with the pad size.

According to one preferred embodiment, the disk surface has a low microwaviness at a scale of 200 μm–500 μm and more for fly height modulation (this length scale is defined by the slider full length), low roughness at a scale of 5 μm or less for surface integrity such as corrosion and defects (this length scale is defined by the magnetic domains TPI and BPI), and high roughness at a scale of 10 to 100 μm to minimize friction between the slider ABS pad and the disk during accidental contact (this length scale is defined by the ABS pad size).

Figure 5:
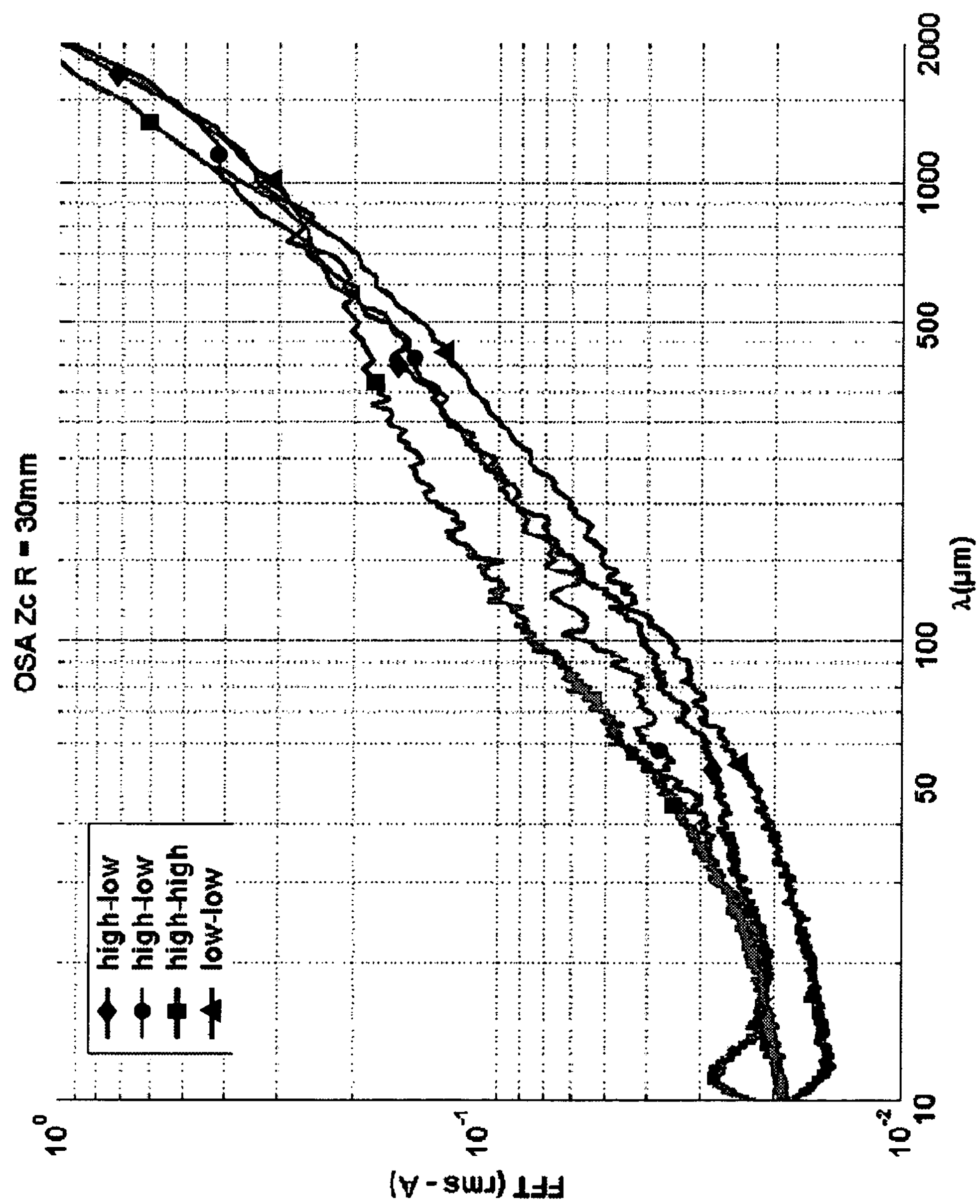
FIG. 5 is a chart illustrating characteristics of a roughness spectrum of several disks over a range of wavelengths.

The characteristics of the roughness spectrum over a range of wavelengths are shown in FIG. 5. The roughness spectrum was measured by an Optical Surface Analyzer (OSA) model TS5100, manufactured by Candela Instruments. The OSA uses a light deflection technique to measure topographical features on the disk surface. The Fourier Transform obtained by an FFT algorithm, is a measure of the surface properties of the disk.

The roughness spectrum of FIG. 5 is a Fourier transform of four disk surfaces: 1) high Rq, low Wq; 2) high Rq, low Wq; 3) high Rq, high Wq; 4) low Rq, low Wq. The smaller the wavelength, the smaller the amplitude of the surface feature. As shown, at the 1000 micrometer wavelength, it is seen that almost all disks have the same amplitude in terms of waviness deviation. However, at 100 micrometers (about the size of the pad), differences can be seen between the various surfaces. The desired disk surface properties have low amplitude at higher wavelengths, but have a higher amplitude at a lower wavelength to avoid the stiction problem.

The inventors also define a scale of the size of the ABS pad. This 10–100 μm ABS pad scale and the 500 μm–1000 μm fly height modulation scale can both be measured on an OSA. The trace analysis gives the following numbers (this is the same information as the plots in FIG. 5):

TABLE 1

| Type AFM | Rq | microXAm Wq | Touch Down Height (from Pressure) |
|---|---|---|---|
| low low | 0.13 nm | 0.3 nm | 4.3 nm (−14 kPa = 0.86 atm) |
| high high | 0.16 nm | 0.4 nm | 3.9 nm (−22 kPa = 0.78 atm) |
| high low | 0.18 nm | 0.35 nm | 2.75 nm (−45 kPa = 0.55 atm) |

To create a disk surface having the desired combination of high Rq and low Wq, the designer can adjust the manufacturing parameters to obtain the desired properties. One skilled in the art will understand how to obtain the surface properties defined herein and so no further discussion of disk manufacturing will be provided.

The new structures described herein provide the following tangible benefits:

(a) Improved yields: For sliders with mechanical fly heights under 5 nm and approaching contact recording, significant yield improvements can result due to the reduced likelihood of slider-disk contact.

(b) Better clearance: The new disk surface should provide about 2 nm improved clearance based on TOP info with disks that have the attributes outlined in the disclosure. This is important when interfaces are flying at or around 5–6 nm.

(c) Slider bounce (stiction due to the smooth surface) for interfaces in contact is significantly reduced. The advantage could be as much as 50% or more over disks with low Rq and low Wq, and/or high Rq and high Wq.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetic disk drive system having a disk and a slider, an outer surface of the disk having a surface microwaviness (Wq) of about 3 angstroms or less at a scale of about 200 microns and higher along the disk surface, and a surface roughness (Rq) of about 4.5 angstroms or more at a scale along the disk surface of less than about a length of a pad of the slider carrying a head for writing to the disk.

2. A system as recited in claim 1, wherein the disk has a surface roughness of about 4.5 angstroms or more at a scale of less than about 200 microns.

3. A system as recited in claim 1, wherein the disk has a surface roughness of about 4.5 angstroms or more at a scale of less than about 100 microns.

4. A system as recited in claim 1, wherein the disk has a surface microwaviness of about 3 angstroms or less at a scale of between about 500 and 1000 microns.

5. A system as recited in claim 1, wherein the disk has a surface roughness of less than about 4.5 Å at a scale of about 5 microns or less.

6. A system as recited in claim 1, wherein the slider flies at a fly height of about 5 nanometers or less from the disk surface.

7. A magnetic disk having a surface microwaviness (Wq) of about 3 angstroms or less at a scale on the disk surface of about 200 microns and higher, and a surface roughness (Rq) defined by an average distance of about 4.5 angstroms or more at a scale along the disk surface of less than or equal to about 100 microns.

8. A disk as recited in claim 7, wherein the disk has a surface roughness of about 4.5 angstroms or more at a scale of less than about 100 microns and greater than about 10 microns.

9. A disk as recited in claim 7, wherein the disk has a surface roughness of about 4.5 angstroms or more at a scale of less than about 100 microns and greater than about 10 microns.

10. A disk as recited in claim 7, wherein the disk has a surface microwaviness of about 3 angstroms or less at a scale of between about 500 and 1000 microns.

11. A disk as recited in claim 7, wherein the disk has a surface roughness of about 4.5 angstroms or more at a scale of less than about 100 microns and greater than about 10 microns, wherein the disk has a low surface roughness distinct from Rq of less than about 4.5 angstroms at a scale of about 5 microns or less.

12. A magnetic storage system, comprising:

a magnetic disk;

at least one head for reading from and writing to the magnetic media;

a slider for supporting the head, the slider having a pad; and a control unit coupled to the head for controlling operation of the head;

wherein an outer surface of the disk has a surface microwaviness (Wq) of about 3 angstroms or less at a scale of about 500 microns and higher along the disk surface, and a surface roughness (Rq) of about 4.5 angstroms or more at a scale of less than about a length of the pad of the slider.

13. A system as recited in claim 12, wherein the slider flies at a fly height of about 5 nanometers or less from the disk surface.

* * * * *

UNITED STATES PATENT AND TRADEMARK OFFICE

CERTIFICATE OF CORRECTION

PATENT NO. : 7,052,786 B2
APPLICATION NO. : 10/757802
DATED : May 30, 2006
INVENTOR(S) : Gillis et al.

It is certified that error appears in the above-identified patent and that said Letters Patent is hereby corrected as shown below:

In the claims:
col. 6, lines 50-53, delete claim 9, which is a duplicate of claim 8.

Signed and Sealed this

Eleventh Day of March, 2008

JON W. DUDAS
*Director of the United States Patent and Trademark Office*